United States Patent
Lanter et al.

(10) Patent No.: US 7,586,301 B2
(45) Date of Patent: Sep. 8, 2009

(54) HALL SENSOR ARRANGEMENT AND USE OF A HALL SENSOR ARRANGEMENT IN A BELT LOCK

(75) Inventors: Joshua Lanter, Ardross WA (AU); Martin Kirchner, Bad Ragaz (CH); Henry-J. Schulze, Domat/Ems (CH)

(73) Assignee: Polycontact AG, Chur (CH)

( * ) Notice: Subject to any disclaimer, the term of this patent is extended or adjusted under 35 U.S.C. 154(b) by 134 days.

(21) Appl. No.: 11/661,291

(22) PCT Filed: Aug. 30, 2005

(86) PCT No.: PCT/CH2005/000512
§ 371 (c)(1),
(2), (4) Date: Feb. 27, 2007

(87) PCT Pub. No.: WO2006/024189
PCT Pub. Date: Mar. 9, 2006

(65) Prior Publication Data
US 2007/0273365 A1 Nov. 29, 2007

(30) Foreign Application Priority Data
Aug. 30, 2004 (CH) .................................. 1422/04
Oct. 19, 2004 (CH) .................................. 1719/04
Feb. 8, 2005 (CH) .................................. 191/05

(51) Int. Cl.
G01R 33/07 (2006.01)
H01L 43/06 (2006.01)
G01B 7/14 (2006.01)
B60R 21/00 (2006.01)

(52) U.S. Cl. .............................. 324/207.2; 324/207.24; 180/268

(58) Field of Classification Search ............ 324/207.11, 324/207.13, 207.2, 207.21, 207.22, 207.23, 324/207.24, 207.26; 24/633, 303, 603, 645; 280/735; 180/268
See application file for complete search history.

(56) References Cited

U.S. PATENT DOCUMENTS 5,241,267 A * 8/1993 Gleixner et al. .......... 324/207.2

(Continued)

FOREIGN PATENT DOCUMENTS

DE 197 51 519 A1 5/1999

(Continued)

OTHER PUBLICATIONS

International Search Reported.

*Primary Examiner*—Kenneth J Whittington
(74) *Attorney, Agent, or Firm*—Buchanan Ingersoll & Rooney PC (57) ABSTRACT

Hall sensor arrangement is disclosed for detection of the change in the position of two components which can move relative to one another into two end positions, with a Hall sensor with at least one Hall measurement field (H; H1, H2) and a field magnet. An actuator is provided for transmitting to the Hall sensor the change in the position of the two components which can move relative to one another. The Hall sensor and the field magnet are combined into a preassembled structural unit. When the position of the field magnet changes relative to the Hall sensor from one end position into the other end position the polarity of the magnetic field acting on the Hall measurement field (H; H1, H2) can change, e.g., the polarity becomes reversed.

30 Claims, 9 Drawing Sheets

U.S. PATENT DOCUMENTS

| | | | |
|---|---|---|---|
| 5,960,523 A * | 10/1999 | Husby et al. | 24/633 |
| 6,611,140 B1 * | 8/2003 | Bloechl et al. | 324/207.21 |
| 2002/0005715 A1 * | 1/2002 | Sato | 324/207.2 |
| 2003/0030431 A1 | 2/2003 | Reininger | |
| 2004/0080491 A1 * | 4/2004 | Takatsuka et al. | 345/156 |
| 2008/0116678 A1 * | 5/2008 | Kirchner et al. | 280/801.1 |

FOREIGN PATENT DOCUMENTS

| | | |
|---|---|---|
| DE | 103 03 363 A1 | 8/2004 |
| EP | 0 861 763 A | 9/1998 |

* cited by examiner

Fig. 1

PRIOR ART

HALL SENSOR ARRANGEMENT AND USE OF A HALL SENSOR ARRANGEMENT IN A BELT LOCK

The invention relates to a Hall sensor arrangement as claimed in the preamble of claim 1. The invention also relates to use of the Hall sensor arrangement in a belt lock.

Hall sensors are commonly used as proximity switches or as sensors for contactless determination of the state of components which can assume two positions. In principle, Hall sensors consist of a semiconductor layer supplied with a constant current, usually in an integrated construction. The constant current is influenced by the magnetic field component perpendicular to the semiconductor layer and the sensor delivers a Hall voltage which can be evaluated, which can be tapped, and which can be used to evaluate the state or also directly as an operating voltage. The integrated construction of Hall sensors makes it possible to integrate an evaluation circuit which is suited for evaluation of the operating state on the Hall sensor.

In the automotive industry Hall sensors are used for example as contactless state sensors for the state of the belt locks of safety belts. Knowledge of the belt lock state is necessary to signal to the passengers to put on and lock the safety belts. Since the introduction of airbags information about the locked state of safety belts is also important for control of activation or deactivation of mechanisms for inflating driver and passenger airbags or side airbags.

EP-A-0 861 763 discloses a belt lock with an integrated Hall sensor which detects the state of the locking body or an ejector for a lock tongue which has been inserted into the belt lock, without contact. In a pretensioned sensor version there is a Hall sensor with a Hall field in the immediate vicinity of the field magnet. By changing the position of the locking body and ejector which for this purpose consist of a ferromagnetic material, the magnetic field of the field magnet is changed. This changes the signal of the Hall sensor and at the Hall sensor output the state change can be tapped as a voltage change. In one alternative version, it is proposed that the Hall sensor with the Hall field be installed without a field magnet and for this purpose the locking body or ejector be made as permanent magnets. In this arrangement the change in the position of the locking body or of the ejector will be detectable by a change of the Hall voltage.

The disadvantage in the belt lock as claimed in EP-A-0 861 763 is that the Hall sensor must be positioned very carefully with respect to the locking element or ejector. Subsequent installation of the Hall sensor is therefore relatively complex and expensive. The Hall sensor is moreover relatively sensitive to external stray fields which can be caused for example by a magnetic key chain. Optionally additional shielding must even be mounted; this further complicates attachment or installation. The susceptibility to external stray fields is further exacerbated by the signal changes being relatively small due to the comparative short distances traversed by the locking body and ejector, when the safety belt lock is being closed or opened. The belt lock version without the biased Hall sensor, in which either the locking body or the ejector is made as a permanent magnet, is of low practicality. The relative positioning of the Hall sensor and of the ejector must take place very accurately and is susceptible to vibrations. Demagnetization of the field magnet over time can even occur due to vibrations of the locking body and ejectors when the safety belt is being opened and closed. This can lead to the Hall sensor becoming ineffective and the state changes of the belt lock no longer being detectable.

The object of this invention is to reduce or avoid these disadvantages of the prior art. A Hall sensor arrangement will be devised which enables simple installation and facilitated installation in a belt lock. It will be possible to avoid complex positioning and calibration of the Hall sensor and field magnet in installation. Simple and economical attachment or installation which also promotes retrofitting of existing belt locks of different designs will be enabled. The Hall sensor arrangement will be simple and economical to produce and install.

These objects are achieved by a Hall sensor arrangement which has the features cited in the characterizing section of claim 1. Developments and/or advantageous versions of the invention are the subject manner of the dependent claims. To achieve these objects the use of a Hall sensor arrangement as claimed in the invention for installation in a belt lock for a safety belt in a motor vehicle and a belt lock with a Hall sensor arrangement as claimed in the invention are proposed.

The invention suggests a Hall sensor arrangement for detection of the change in the position of two components which can move relative to one another into two end positions, which arrangement comprises a Hall sensor with at least one Hall measurement field and a field magnet. There is an actuator for transmitting to the Hall sensor the position change of the two components which can move relative to one another. The Hall sensor and the field magnet are combined into a preassembled structural unit such that when the position of the field magnet changes relative to the Hall sensor from one end position into the other end position the polarity of the magnetic field acting on the Hall measurement field changes, preferably is reversed.

By combining the Hall sensor and the field magnet into a preassembled structural unit, when using the Hall sensor arrangement, for example in a belt lock, the complex positioning and calibration of the discrete individual components are eliminated for the user. A preassembled structural unit can be used which has an actuator for transmitting to the Hall sensor the change in position of the components which can move relative to one another. The structural unit is advantageously made such that during assembly, the mounting of the individual components, Hall sensor, field magnet and actuator in exact positions is ensured. The arrangement of the Hall sensor and field magnet is chosen such that for a relative displacement of the two components a signal change as large as possible is produced. In this connection the circumstance is used that on the Hall sensor the greatest signal changes occur when the polarity of the magnetic field changes, is preferably even reversed, in the change of the relative position of the field magnet.

When using a Hall sensor arrangement in a belt lock, combining the individual components into a preassembled structural unit ensures that the safety belt manufacturer need not intervene in his production process by installing the Hall sensor arrangement. Installation only takes place after completion of the production process of the belt lock. In installation the Hall sensor arrangement is for example simply slipped onto the frame of the locking mechanism of the belt lock. The actuator as a single component of the structural unit comes into contact with the movable component of the locking mechanism.

In a first advantageous version of the invention, all components of the state sensor are combined in a modular construction. The Hall sensor module in this case is made such that it can be installed later into the belt lock. It comprises a Hall sensor which is arranged fixed in a depression of the module housing, a lever which can be moved into two end positions, with a recess in which the field magnet is fixed, and a compression spring which applies a force to the lever. The lever is bent and projects through a recess out of the module housing. In the assembled state the bent section of the lever interacts nonpositively with the component of the locking mechanism which changes its position upon actuation. By combining all components of the state sensor into a module, their position is largely immaterial, as long as the bent section of the lever interacts to the desired extent with the movable component to be monitored. All adjustments have already been made when the individual components are installed in the module housing. The module is installed entirely in the belt lock and in this way is nonpositively connected to the component which changes its position when the locking mechanism is actuated. Complex subsequent adjustment of the Hall sensor and the field magnet can be eliminated.

By the Hall sensor being made as a differential Hall sensor with two measurement fields, magnetic field differences can be measured with the sensor. In difference formation of the signals delivered from the Hall measurement fields interference effects from external magnetic fields can be very easily eliminated. Due to the extensive invulnerability of the difference Hall sensor to external magnetic interference fields even smaller changes of the magnetic field acting on the difference Hall sensor can be detected. The linear arrangement of the Hall measurement fields behind or next to one another takes into account the circumstance that the movement of the components which are changing their location takes place essentially linearly. In this way the prerequisites are established for optimization of the size of the signal change at the output of the difference Hall sensor.

In a Hall sensor arrangement with a differential Hall sensor which is not biased, the field magnet is advantageously located on a movable component such that its direction of motion when the position of the monitored component changes runs essentially parallel to the linear arrangement of the Hall measurement fields on the Hall sensor. The parallel motion leads to the greatest possible signal change. In movement parallel to the Hall measurement fields the distance of the field magnet from the Hall measurement fields of the differential Hall sensor remains essentially constant. In this way the signal change or the travel alone is a function of the movable component which changes its position, for example the component of a locking mechanism which changes its position when the belt lock is locked.

In one version of the Hall sensor arrangement as claimed in the invention with a differential Hall sensor which is not biased, the field magnet has magnetization which runs essentially perpendicular to the linear arrangement of the Hall measurement fields on the Hall sensor. To increase the signal change or the travel it is advantageous if the field magnet on the movable component has magnetization which runs essentially parallel to the linear arrangement of the Hall measurement fields on the Hall sensor. Preferably the field magnet is located on the movable component such that when its position changes, the two magnet poles are routed past the two Hall measurement fields of the differential Hall sensor. In this way opposite signal changes are caused by the magnetic north and south pole in the two Hall measurement fields. When the signals produced in the Hall measurement fields are subtracted, the signal changes are added and lead to doubling of the signal change detected overall or of the travel.

The Hall sensor arrangement can also have a Hall sensor, for example a differential Hall sensor which is biased. For this purpose there is another permanent magnet as the field magnet in the immediate vicinity of the Hall sensor. The used of a biased Hall sensor even makes it possible to omit a permanent magnet on the actuator. In this simplified version at least the section of the actuator which has been guided past the Hall sensor when the relative position of the two components changes consists of a ferromagnetic material which when the position changes disrupts the magnetic field of the field magnet such that a voltage change can be detected on the Hall sensor.

Another very advantageous version of the invention calls for the Hall sensor and at least one field magnet to be located on an adapter which is made as a monolithic component. The adapter is made such that it can be mounted on the stationary component of the two components which can move relative to one another. The adapter has two adapter parts which are made to be movable relative to one another, one adapter part bearing the Hall sensor and the second adapter part bearing the field magnet. The adapter construction is especially space-saving. No additional components, for example actuators or the like, are required for its operation. The movable adapter part can be positively driven by its being positively and nonpositively connected to the movable component which changes its relative position. In one alternative version the movable adapter part is elastically pretensioned relative to the permanently mounted adapter part. This can be accomplished by the inherent spring force or can be supported by a spring or similar elastic element integrated on the permanently mounted adapter part and the movable adapter part. The elastically pretensioned adapter part then adjoins the component which changes its position to two alternative end positions. The Hall sensor is advantageously located on the permanently mounted adapter part. This facilitates routing of the electrical lines which are also hardly exposed to mechanical stress. The movable adapter part bears the field magnet. The Hall sensor and the field magnet are advantageously arranged such that they have a distance as small as possible from one another. In this way, on the Hall sensor larger signal changes can be achieved.

The Hall sensor can be biased by another field magnet which is located in the immediate vicinity of the sensor. The Hall sensor can also be made in turn as a differential Hall sensor.

The Hall sensor adapter is made especially for use in a belt lock. In this connection the space-saving, flat, monolithic construction is especially advantageous. The Hall sensor adapter can be easily clipped or suspended on the frame of the belt lock. The movable adapter part interacts with a component which changes its position to two end positions when the lock mechanism is actuated. In positive action of the movable adapter part it is for example a rocker which bears a locking body. In the case of a spring-pretensioned adapter part it for example adjoins the rocker or a spring which acts on the locking body.

Relatively large signal levels and thus large signal-to noise-ratios can be achieved by the relative movement of the field magnet to the Hall sensor. The Hall sensor arrangement in the installed state is located on the side of the belt lock facing away from the passenger. This largely prevents any adverse effect by external magnetic fields, for example by a magnet or the like which is located in the pocket of the pants or coat of the passenger. By mounting the Hall sensor arrangement, for example the Hall sensor module or the Hall sensor adapter, in the interior of the belt lock, the surrounding metal components, especially the frame of the belt lock, apply a shielding action against external interference effects. Due to the extensive invulnerability of the Hall sensor arrangement which has been installed in this way, the Hall sensor can be made as a conventional Hall sensor with only one measurement field or as a differential Hall sensor with two measurement fields which are located next to one another. The Hall sensor can also be pretensioned. The Hall sensor arrangement in the form of a structural unit is characterized especially in that modifications of the belt lock for its installation are not necessary. The clipped-on or suspended Hall sensor adapter also largely eliminates rattling noise of the belt lock by suppressing larger relative movements of the rocker which bears the lock part against the frame of the belt lock.

In one feasible version of the Hall sensor adapter, one adapter part has two lengthwise arms with free ends which are provided with retaining hooks. In the installed state, the retaining hooks extend around two vertical members which project roughly vertically from the frame of the belt lock. The lengthwise arms are connected by a cross arm which is made in the manner of clamp and in the mounted state peripherally clamps one end section of the rocker which can be tilted into two end positions. The second adapter part is made as a link which is movably coupled to the cross arm via a hinge joint and which has fasteners for locking to the corresponding counterparts on the rocker. The hinge joint is advantageously made as a film hinge. Film hinges can be easily produced and have a relatively high strength and long service life. Due to the flat execution of the film hinge, deflections laterally are largely avoided. They can be still further limited by lateral stiffening of the film hinge.

The fasteners provided on the link encompass snap hooks which can be routed through a hole of the rocker and can be locked to the rocker. Opposing holders located on the link in the mounted state of the adapter press against the rocker and provide for positive and nonpositive locking of the link to the rocker. This ensures that the link cannot be detached from the rocker even by greater vibrations and operation of the state sensor arrangement is preserved.

In a second version of the Hall sensor adapter, the adapter part which can be permanently installed is made frame-like with holding devices for mounting on the belt lock frame. The second adapter part which moreover forms the actuator has the shape of a movable tongue which is surrounded by the frame and, pretensioned elastically relative to the frame, is connected to the frame part.

The Hall sensor and field magnet can be located permanently or removably on the Hall sensor adapter. In one preferred version the Hall sensor is located in a receiver which is provided on one of the lengthwise arms of the adapter. The field magnet is located in the vicinity of the Hall sensor on the movable adapter part. It goes without saying that the arrangement of the Hall sensor and of the field magnet can also be interchanged.

For reasons of production engineering, the adapter is a monolithic plastic part which can be produced in an injection, casting or injection molding process. The production processes are proven and allow large numbers of pieces in uniform quality with low production tolerances.

Other advantages and features of the invention will become apparent from the following description of embodiments of the belt lock. The figures are schematic.

Figure 1:
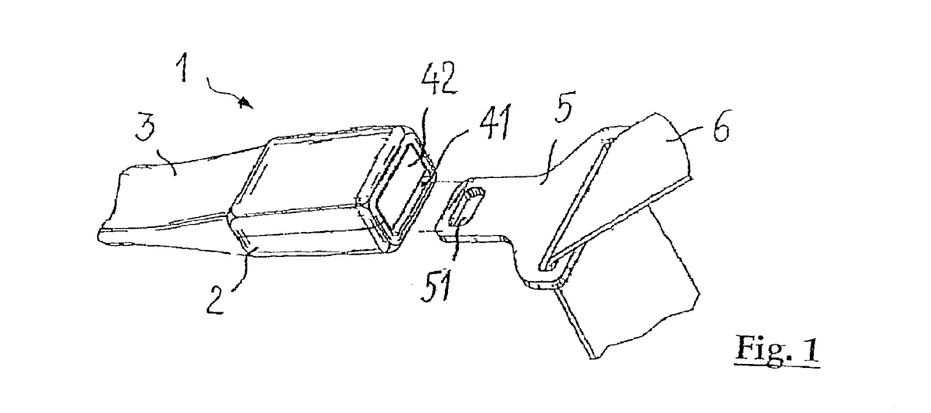
FIG. 1 shows an overview of a belt lock.

The belt lock shown schematically in FIG. 1 has a known external structure and is provided overall with reference number 1. The belt lock 1 is located on the end of the belt anchoring 3 and is used for holding and detachable locking of the lock tongue 5 which is connected to a safety belt 6. The belt lock 1 has a housing 2 which is made open on its side facing away from the belt anchoring 3. An unlocking button 42 for the locking mechanism located within the housing 2 extends over most of the open housing region and leaves an insertion slot 41 for the lock tongue 5 free. The locking mechanism locks when the lock tongue 5 is inserted through the insertion slot 41 in the tongue recess 51. The release of the lock tongue 5 takes place by actuating the unlocking button 42.

Figure 2:
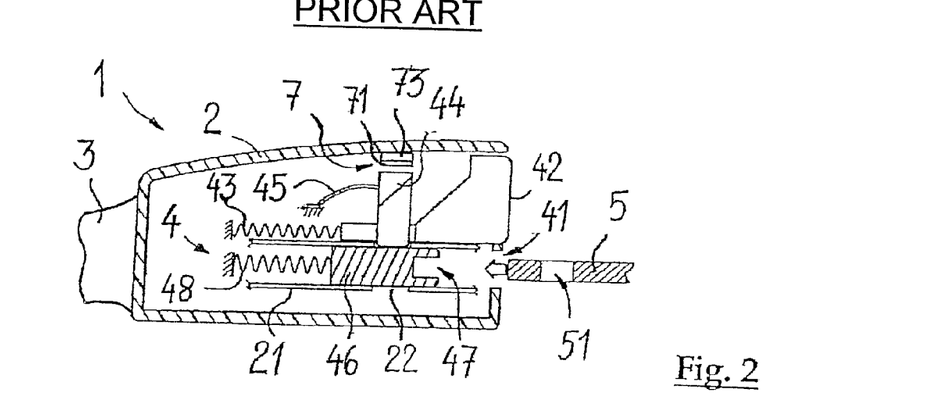
FIG. 2 shows a section of a belt lock of the prior art with a Hall sensor and a field magnet.

The schematic section shown in FIG. 2 shows the structure of a belt lock of the prior art with a locking mechanism 4 located within the housing 2 for a lock tongue 5 which has been inserted through the insertion slot 41. The locking mechanism 4 is conventionally made. It comprises a frame 21 with a guided ejector 46 which is pretensioned by a compression spring 48 in the direction of the insertion slot 41. On its end facing the insertion slot 41 the ejector 46 has a tongue receiver 47. The lock tongue 5 is inserted against the spring force of the compression spring 48 into the housing 2. As soon as it has been inserted so far that the tongue recess 51 is aligned with a recess 22 in the frame 21, the locking body 44 which is located on the rocker 45 moves through the tongue recess 51 in the direction of the recess 22 and in doing so fixes the lock tongue 5. Release of the lock tongue 5 takes place by actuating the unlocking button 42 against the spring force of a pretensioning spring 43. In this connection the locking body 44 is pulled back out of the tongue recess 51 and the spring-loaded ejector 46 pushes the lock tongue 5 in the direction of the insertion slot 41. At the same time the ejector 46 prevents movement of the locking body 44 in the direction of the recess 22 in the frame 21.

The change in position of the locking body 44 is detected by a contactless state sensor 7 which is located on the housing 2 in the vicinity of the locking body 44. The state sensor is a Hall sensor 71 which is pretensioned by a field magnet 73 which is located in the immediate vicinity. The output signal of the Hall sensor 71 is dependent on the magnetic field intensity of the field or bias magnet 73. When the locking mechanism 4 is actuated the locking body 44 is moved away from the Hall sensor 71 or toward it. If the locking body 44 is a ferromagnetic component or is connected to one, the location of the moving locking body 44 influences the intensity of the magnetic field and thus the magnitude of the signal at the output of the Hall sensor 71. The Hall sensor can also be for example a differential Hall sensor.

Figure 3:
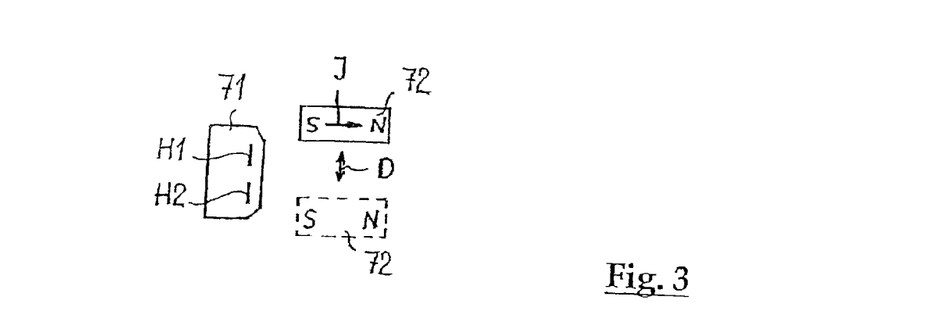
FIGS. 3-7 show schematics of arrangements of a Hall sensor and a field magnet which can move relative to one another into two end positions as claimed in the invention.
Figure 4:
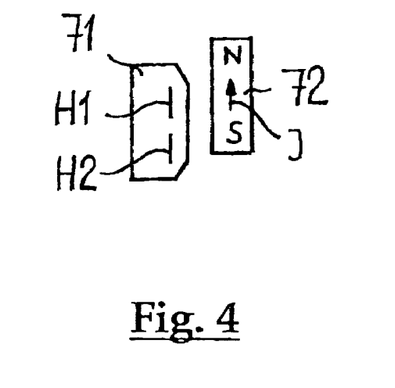
Figure 5:
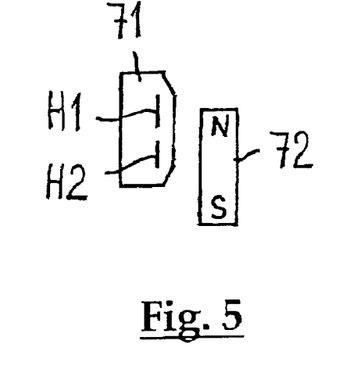

FIGS. 3 to 7 schematically show different versions of the arrangement as claimed in the invention of a Hall sensor 71 and a field magnet 72 which can be moved relative to one another from one end position into a second end position. In the versions as shown in FIGS. 3-5 the Hall sensor 71 is made as a differential Hall sensor. The differential Hall sensor 71 has two Hall measurement fields H1, H2 which are located linearly next to one another and allows the formation of difference signals. In this connection interference effects by external magnetic fields which act in general identically on the two Hall measurement fields H1, H2 are cancelled. By using a differential Hall sensor 71 the sensor arrangement therefore is largely insensitive to effects of external magnetic interference. The signal which results when the difference is found is a direct measure of the change in the position of the field magnet and thus the change in the position of a monitored component. The signal can be evaluated or used for triggering other operating processes.

In the use of the Hall sensor arrangement as claimed in the invention in a belt lock, when the locking mechanism is actuated displacement D of the field magnet 72 takes place parallel to the linear arrangement of the Hall measurement fields H1, H2 next to one another or in succession. The magnitude of the attainable output signal depends among others on the magnetization J of the field magnet 72 which has moved past the differential Hall sensor 71. In the arrangement as shown in FIG. 3 the field magnet 72 is magnetized perpendicular to the linear arrangement of the two Hall measurement fields H1, H2 of the differential Hall sensor 71. In the first end position shown solid in FIG. 3 for example the magnetic south pole of the field magnet 72 is facing the differential Hall sensor 71. In this first end position the magnetic south pole of the field magnet 72 influences the Hall measurement field H1 of the differential Hall sensor 71 much more strongly than the Hall measurement field H2. After displacement D of the field magnet 72 into the second end position, the magnetic south pole of the field magnet 72 indicated by the broken line influences the Hall measurement field H2 of the differential Hall sensor 71 much more strongly than the Hall measurement field H1. For this position change of the field magnet 72, from the viewpoint of the Hall measurement fields H1 and H2 the polarity of the magnetic field is changed. The signal intensity or travel results from the difference of the signals produced on the two Hall measurement fields.

FIGS. 4 and 5 show a second arrangement as claimed in the invention of a differential Hall sensor 71 and a field magnet 72 as claimed in the invention. In this connection, the two alternative end positions of the field magnet 72 relative to the differential sensor 71 are shown in separate figures. Magnetization J of the field magnet 72 this time proceeds parallel to the linear arrangement of the two Hall measurement fields H1, H2 of the differential Hall sensor 71. In the version shown in FIG. 4, the magnetic south pole of the field magnet 72 first of all influences the Hall measurement field H2 of the differential Hall sensor 71. The Hall measurement field H1 is located in the vicinity of the lengthwise center of the rod-shaped field magnet 71 and experiences a resulting magnetic field intensity near zero. After the position of the field magnet 72 changes to the second end position shown in FIG. 5, the magnetic north pole of the field magnet 72 now influences the Hall measurement field H1 of the differential Hall sensor 71 much more strongly than the Hall measurement field H2. The latter now experiences a resulting field intensity near zero due to its location in the vicinity of the lengthwise center of the rod-shaped field magnet 72. In the relative change in the position of the field magnet 72 to the differential Hall sensor 71 the magnetic north pole of the field magnet 72 in the measurement field H1 produces a signal change opposite the influence of the magnetic south pole on the measurement field H2. The Hall measurement fields H1 and H2 undergo a change of the polarization of the acting magnetic field when the position of the field magnet changes. When the two signals are subtracted, the signal changes are added and the signal intensity or the travel is doubled relative to the version as shown in FIG. 3. The arrangement shown in FIGS. 4 and 5 is especially advantageous in the detection of very small position changes.

Figure 6:
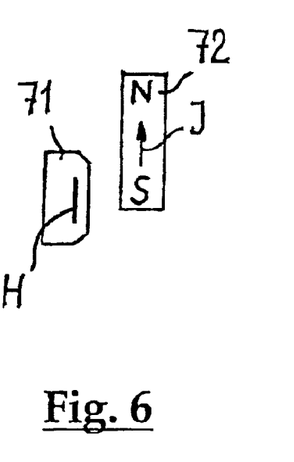
Figure 7:
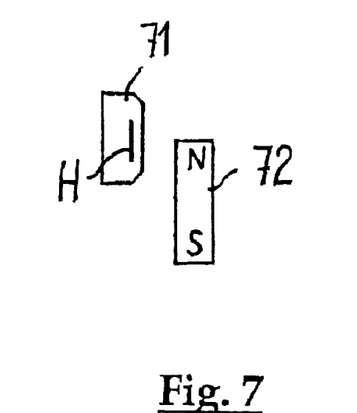

FIGS. 6 and 7 show an arrangement of a Hall sensor 71 and a field magnet 72 analogous to the version in FIG. 4 and FIG. 5. The magnetization J of the field magnet 72 runs in turn parallel to the surface of the sole measurement field H of the Hall sensor 71. In the first end position shown in FIG. 6, the Hall measurement field H is exposed for example to the south pole of the field magnet 72. In the second end position as shown in FIG. 7, the Hall measurement field is exposed to the north pole of the field magnet 72. The Hall measurement field thus experiences reversal of the polarization of the magnetic field. The resulting signal change can be evaluated or used for triggering further switching processes.

The field magnet 72 is advantageously a permanent magnet made as a bar magnet. The Hall sensor or the differential Hall sensor 71 is advantageously made in an integrated design. In this connection for example the evaluation circuit and other circuit components necessary in any case for further processing of the detected signals are preferably already integrated on the component.

Figure 8:
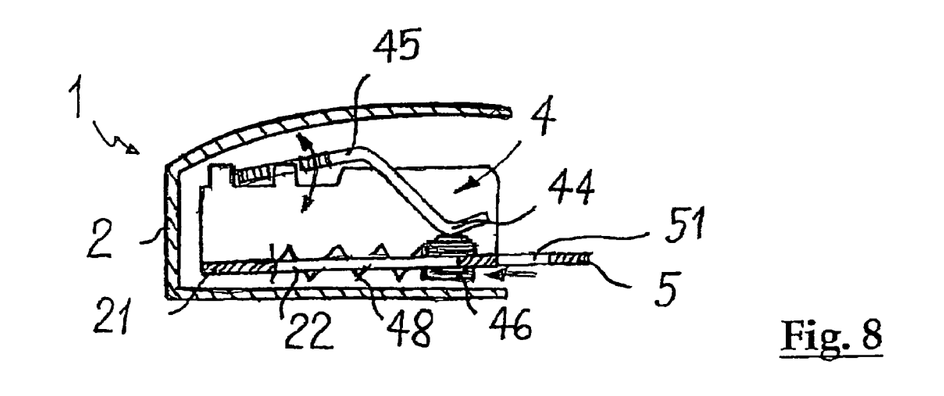
FIG. 8 shows a section of a belt lock of the prior art.
Figure 9:
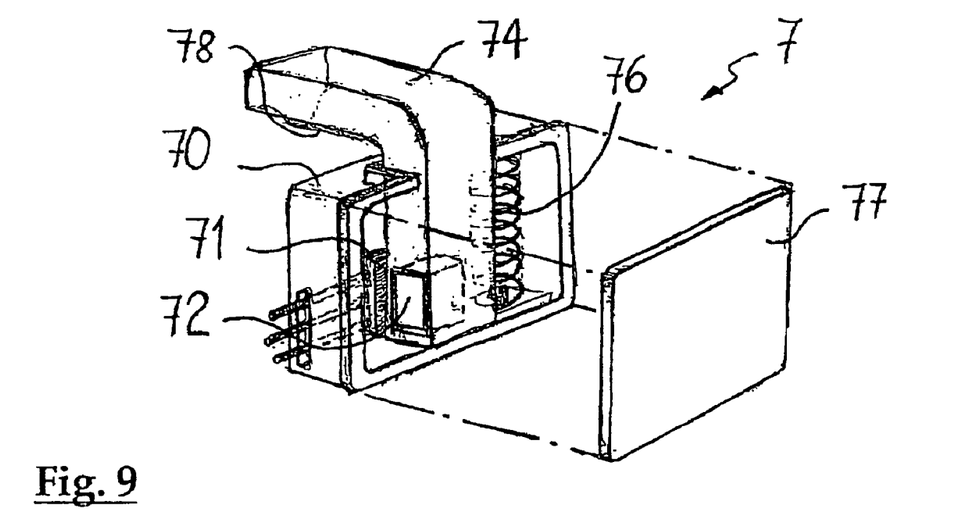
FIGS. 9-13 show schematics in explanation of a first embodiment of the Hall sensor as claimed in the invention using the example of a Hall sensor module.
Figure 10:
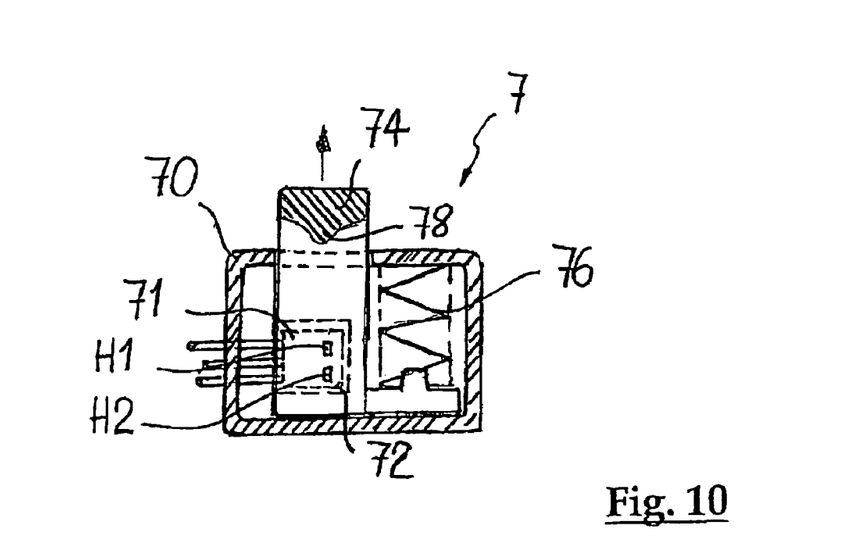
Figure 11:
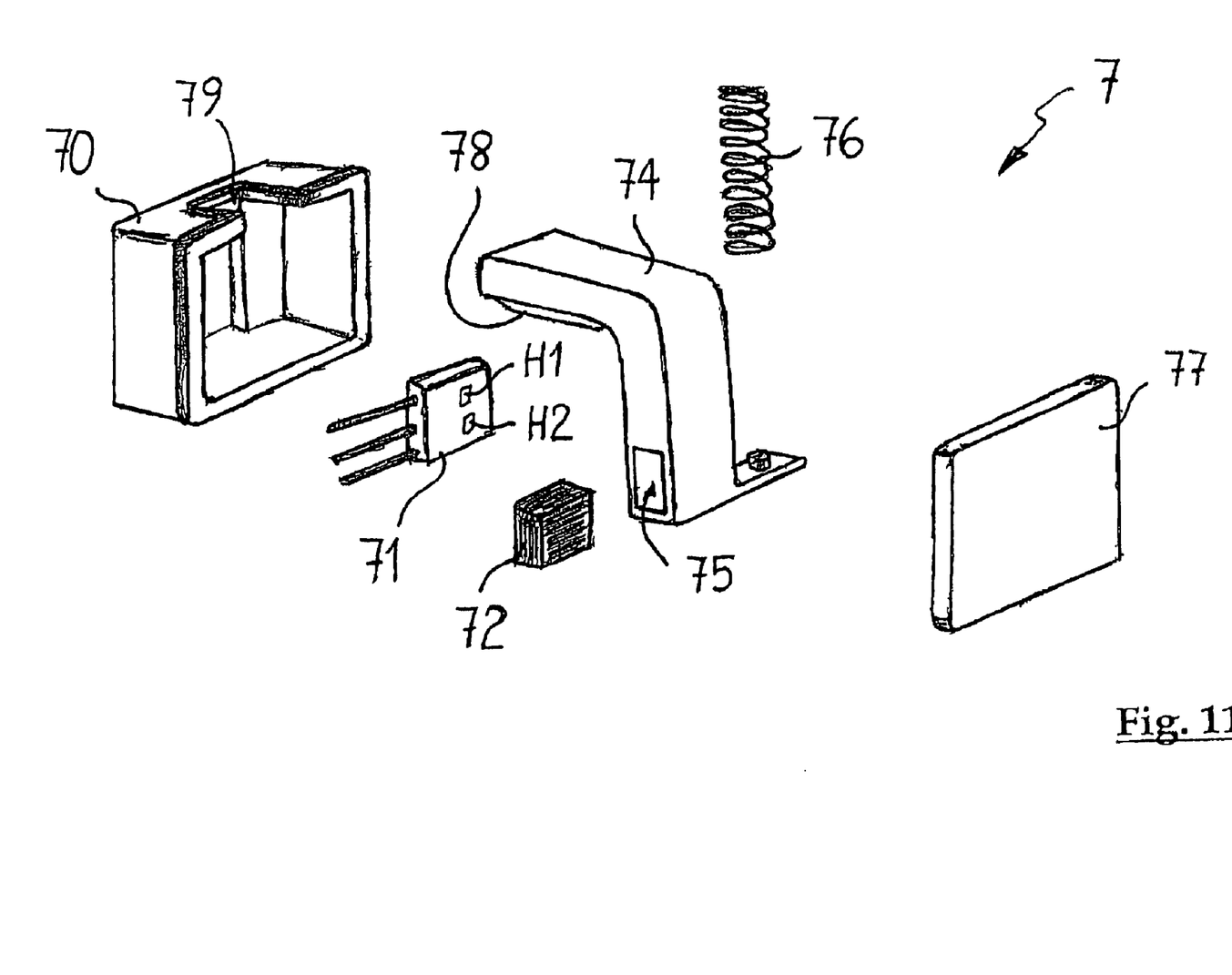

FIG. 8 shows a schematic section of a belt lock which has been long known in the prior art and which is provided overall with reference number 1. The structure of the belt lock 1 has great similarities to the version shown in FIG. 2. The locking mechanism located within the housing 2 in turn overall bears reference number 4 and encompasses a frame 21 and a locking body 44 which is located on a rocker 45 and which in this embodiment is made as a locking hook 44 projecting from the rocker 45. The possibilities of movement of the rocker 45 into its two end positions are indicated by a double arrow. In the opened state the locking hook 44 lies on the ejector 46 which is exposed to the force of the compression spring 48. When the lock tongue 5 is inserted the ejector 46 is pushed against the reset force of the compression spring 48 and the locking hook 44 drops through the tongue recess 51 and the recess 22 of the frame 21.

FIGS. 9-13 show a Hall sensor arrangement combined into a structural unit as claimed in the invention and provided overall with reference number 7. In contrast to the belt locks of the prior art (FIG. 2) in which the Hall sensor and the field magnet are mounted as individual components separately in the belt lock, the Hall sensor arrangement 7 as claimed in the invention is made as a Hall sensor module in which all the components necessary for operation are located in a common module housing 70 which can be closed with the housing cover 77. The individual components of the Hall sensor arrangement 7 are a Hall sensor 71 which is located fixed in the housing depression, for example a differential Hall sensor with Hall measurement fields H1 and H2, and an actuator which is made as a lever 74 with a recess 75 in which a field magnet 72 is fixed. A compression spring 76 which is located within the module housing 70 and which is supported on the one hand in the module housing 70 and on the other on the lever 74 acts on the lever 74. A section of the lever projecting through a recess 79 out of the module housing 70 is bent in the manner of a hook. There is a lengthwise rib 78 or similar projections on the bottom of the lever section projecting out of the module housing 70.

Figure 12:
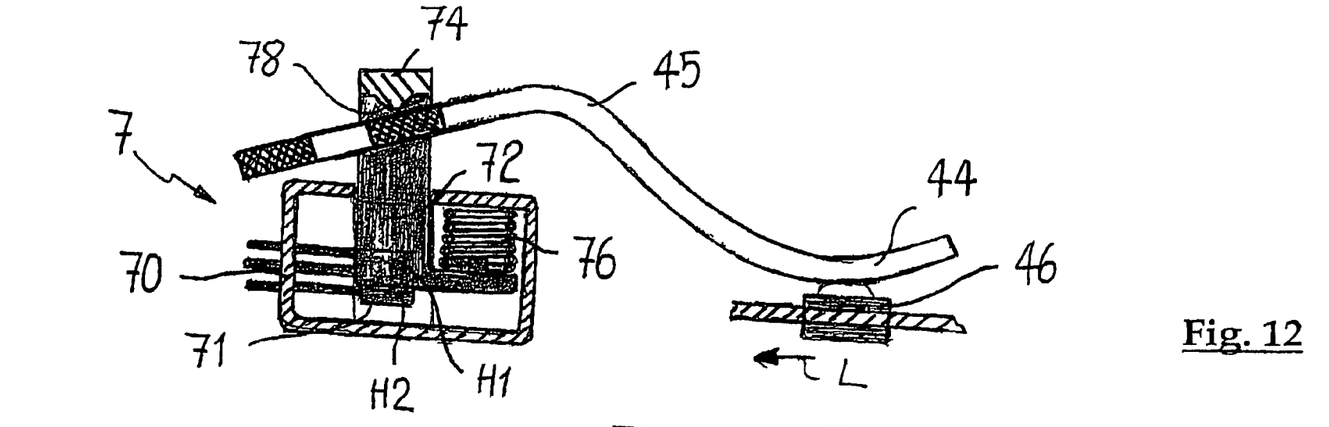
Figure 13:
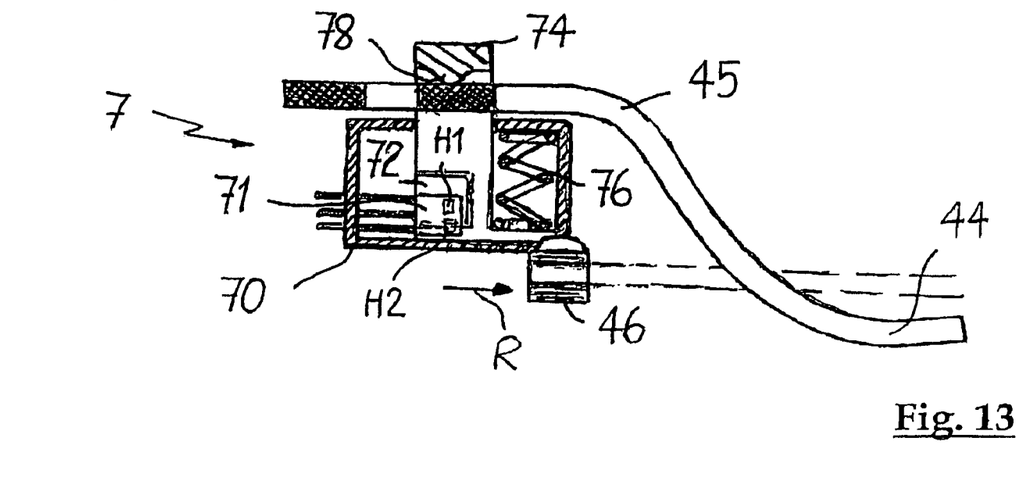
Figure 14:
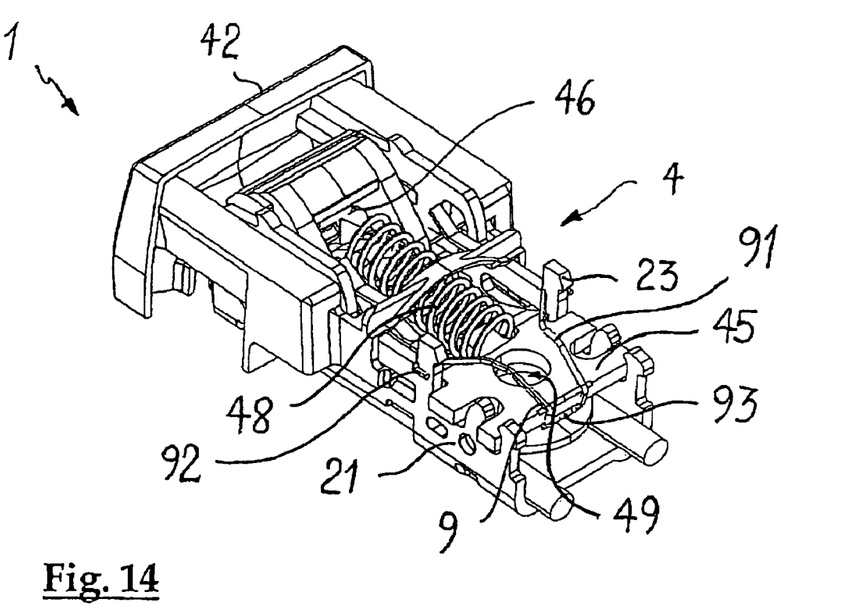
FIG. 14 shows a perspective of a belt lock known from the prior art without the surrounding housing.

The Hall sensor arrangement 7 assembled in a modular manner encompasses all components which are necessary for detection of the change in the position of two components which can move relative to one another. The Hall sensor 71 and the field magnet 72 are in a three-dimensional relation which can be exactly dictated. The size of the module is such that it can subsequently be easily integrated into the belt lock. The function of the Hall sensor module 7 is shown in the schematics in FIGS. 12 and 13 using the example of the belt lock as shown in FIG. 8. FIG. 12 shows the belt lock in the opened state. FIG. 13 shows the state of the locked belt lock. When the passenger is being belted the lock tongue is pushed into the lock housing and the ejector 46 is pushed according to arrow L. In doing so a spring-loaded rocker 45 tilts, and a locking body 44 connected to the rocker 45 moves into the position shown in FIG. 13. The Hall sensor module 7 is located in the belt lock such that the section of the lever 74 projecting out of the module housing 70 extends over the rocker 45. The compression spring 76 which is located within the module housing 70 and which is compressed in the initial state as shown in FIG. 14 presses the lever 74 by its pretensioning against the bottom of the module housing 70. When the compression spring 76 is released, the lever 74 necessarily follows the tilting motion of the rocker 45 (FIG. 13). The field magnet 72 which is fixed in the recess 75 of the lever 74 goes along with the movement of the lever 74 and is moved past the Hall measurement fields H1, H2 of the differential Hall sensor 71. The change in the magnetic field which occurs in doing so is detected and the signal "passenger belted" is generated therefrom for example.

When the belt is released, the lock tongue is pulled out of the lock housing. In doing so the ejector according to arrow R in FIG. 13 is pressed back into the initial position from FIG. 12. The locking body 44 on the rocker 45 is released and tilts back into the initial position shown in FIG. 12. The lever 74 which is guided desmodromically in the Hall sensor module 7 is entrained by the rocker 45 and migrates up in the module housing 70. In doing so that the compression spring 46 is compressed again. In this motion of the lever 74 the field magnet 72 is moved past the Hall sensor 71 which is located stationary in the module housing 70. The Hall measurement fields H1, H2 detect the change of the magnetic field intensity and produce a signal, for example "passenger not belted".

The rib 78 which is provided on the bottom of the section of the lever 74 projecting out of the housing module provides for linear support of the lever 74 on the rocker 45. This design is less susceptible to dirt and prevents wedging of the lever 74.

In a version of the Hall sensor arrangement made as a Hall sensor module which is not shown separately, the field magnet can be located in the immediate vicinity of the stationary Hall sensor and can likewise be mounted stationary. In this Hall sensor arrangement the field magnet forms a bias magnet for the Hall sensor. If the section of the lever which has moved past the Hall sensor consists of a ferromagnetic material, in this version of the Hall sensor module an additional field magnet mounted on the lever can be omitted, since the change in the position of the ferromagnetic section of the lever leads to detectable magnetic field changes. For the attainable signal changes however for a biased Hall sensor which can also be a differential Hall sensor it is advantageous if the lever bears a permanent magnet.

FIG. 14 shows another belt lock known from the prior art without the surrounding housing. The belt lock is in turn provided with reference number 1. The locking mechanism is held in a belt lock frame 21. The locking mechanism 4 in turn comprises a rocker 45 and an ejector 46 pretensioned by the compression spring 48 in the direction of the insertion slot. The unlocking button is indicated at 42. The rocker 45 is provided for reasons of weight with a hole 49 on its end section facing away from the insertion slot. To prevent rattling noise, there is a spring clip 9. It has two clip arms 91 and a crosspiece 93 which is made in the manner of a clamp and which connects the clip arms 91. The ends of the clip arms 91 are made as hooks 92. The spring clip 9 is on the one hand anchored via hooks 92 on the vertical members 23 which project vertically out of the frame 21. The crosspiece 93 made in the manner of a clamp encompasses the end section of the rocker 45 which is provided with a hole 49. The spring clip 9 limits or prevents relative movements of the rocker 45 relative to the frame 21. Rattling noise of the belt lock 1 is thus largely prevented.

Figure 15:
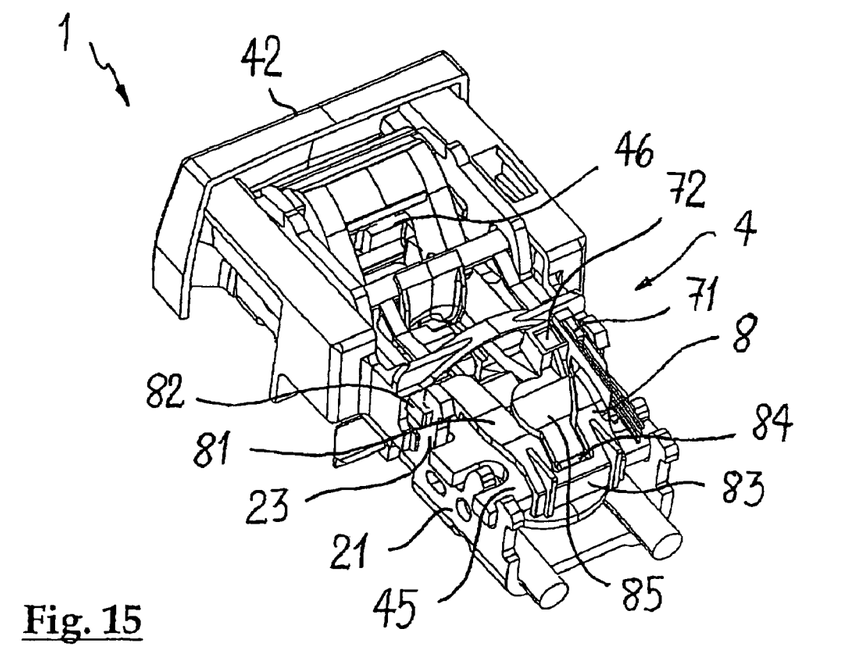
FIGS. 15-17 show different views of a second embodiment of the Hall sensor arrangement using the example of a Hall sensor adapter mounted in the belt lock as shown in FIG. 14.
Figure 16:
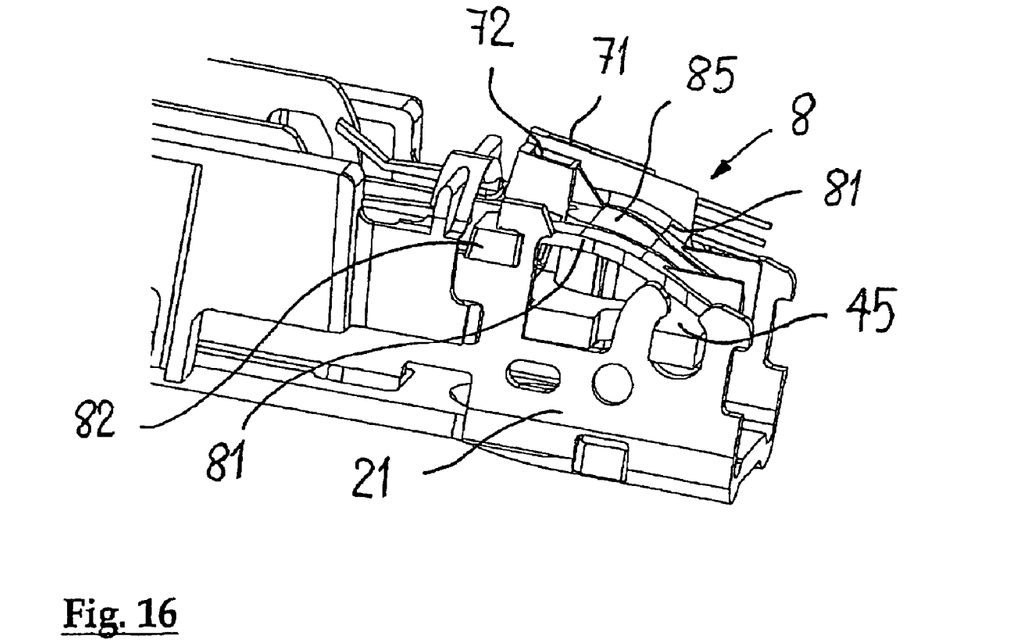
Figure 17:
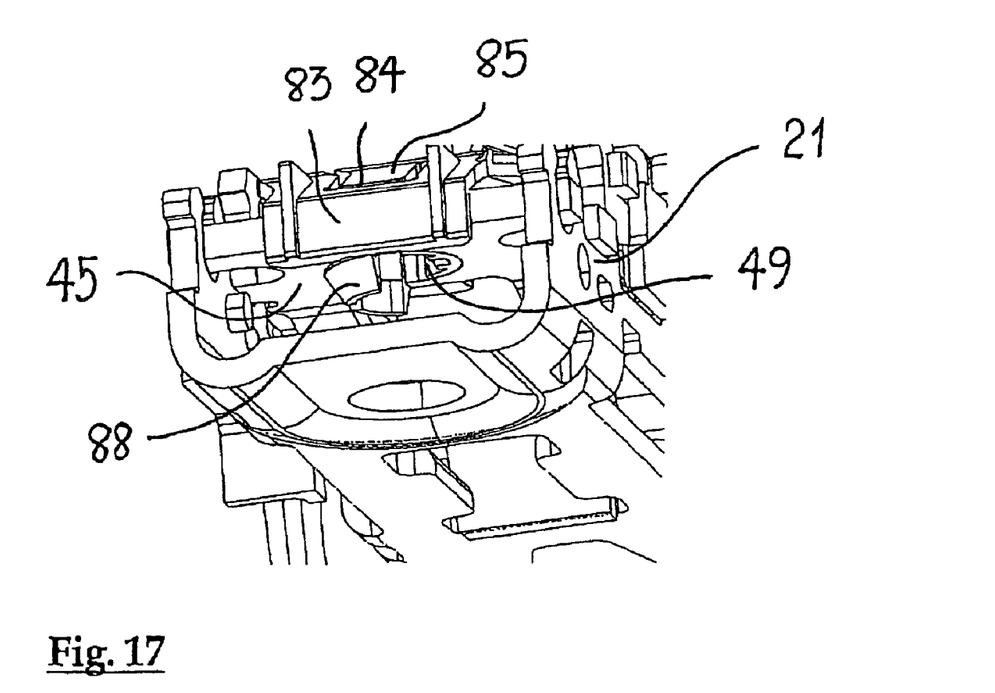

FIG. 15 shows in a representation analogous to FIG. 14 a second version of the Hall sensor arrangement as claimed in the invention using the example of a Hall sensor adapter 8 mounted in a belt lock. In this connection, for reasons of clarity the compression spring (reference number 48 in FIG. 4) is not shown. The belt lock is in turn provided with reference number 1. FIGS. 16 and 17 show other views of the belt lock as shown in FIG. 15 provided with the Hall sensor adapter 8. As is directly apparent from the figures, the Hall sensor adapter 8 is installed instead of the spring clip (reference number 9 in FIG. 14). The Hall sensor adapter 8 bears a preassembled Hall sensor 71 and a field magnet 72.

Figure 18:
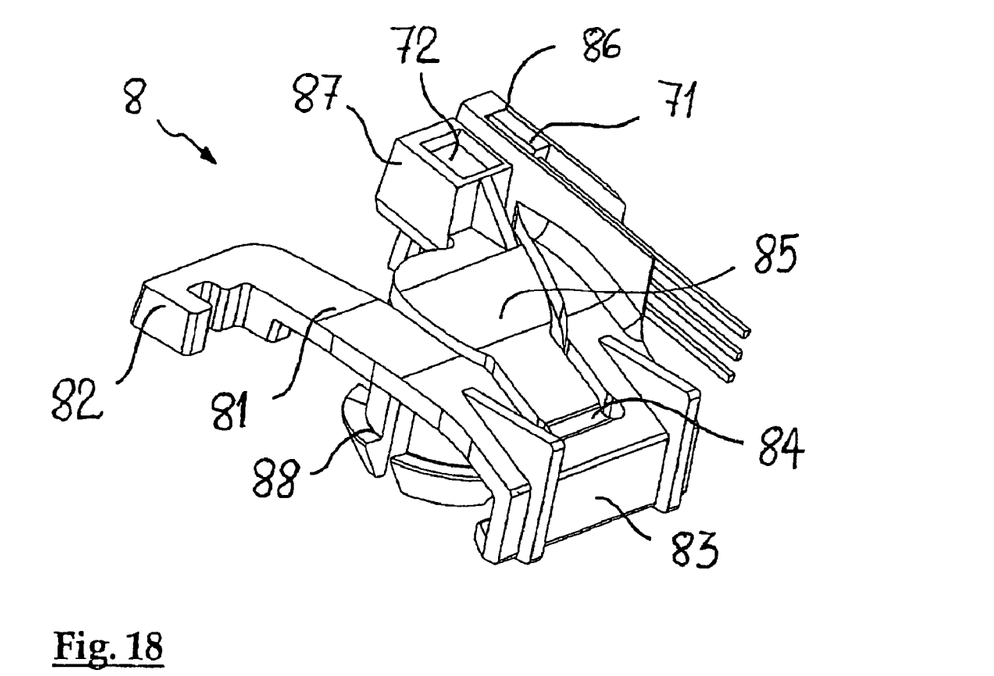
FIGS. 18 and 19 show two perspective views of the Hall sensor adapter as shown in FIGS. 15-17.
Figure 19:
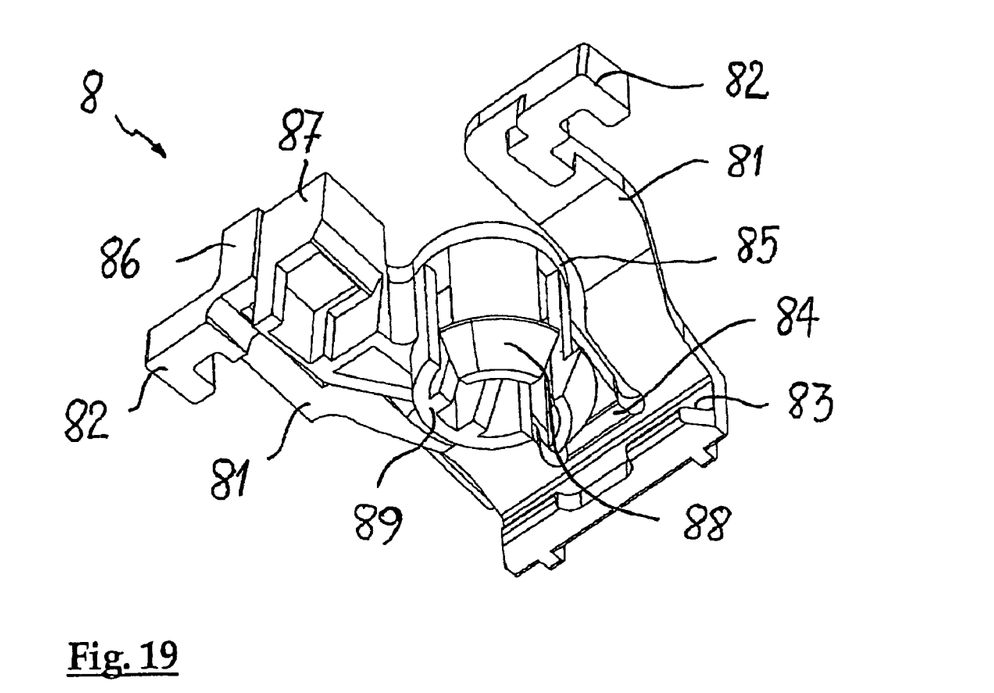

The adapter 8 shown enlarged in FIGS. 18 and 19 in two views has a first adapter part in the form of two lengthwise arms 81 which are connected by the cross arm 83 made in the manner of a clamp. The lengthwise arms 81 extending in the direction of the insertion slot are provided on their ends with retaining hooks 82. The retaining hooks 82 are used to anchor the vertical members 23 projecting vertically from the belt lock frame 21. Shoulder-like projections on the vertical members 23 prevent unintentional release of the anchoring of the hooks 82 from the vertical members 23. The cross arm 83 made in the manner of a clamp surrounds the end section of the rocker 45. In this way larger relative movements of the rocker 45 relative to the belt lock frame 21 are suppressed and rattling noise is largely prevented.

A second adapter part in the form of a link 85 projects from the cross arm 83 of the adapter 8 and extends in the direction of the lengthwise arms 81. The link 85 is movably coupled via a hinge joint 84, preferably a film hinge, on the cross arm 83 of the adapter and forms the actuator of the Hall sensor arrangement made as a Hall sensor module 8. From the bottom of the link a snap hook 88 projects and extends through the hole 49 in the end section of the rocker 45 and reaches positively behind it. An opposing holder 89 opposite the snap hook 88 is supported on the surface of the rocker 45. In this way the movably connected link 85 is fixed positively and nonpositively on the rocker 45. The fixing of the link 85 on the rocker 45 is preferably detachable.

One of the lengthwise arms 81 of the adapter 8 has a receiver 86 for a Hall sensor 71. For example, the receiver 86 is made as a slot into which the Hall sensor 71 which can be made as a Hall sensor with one measurement field or as a differential Hall sensor with two measurement fields located next to one another can be inserted and can be fixed with respect to its position. Signal lines connect the Hall sensor 71 to an evaluation device. On the free end of the link 85 there is a holding device 87 for a field magnet 72 of the Hall sensor arrangement. The field magnet 72 is located within very narrow production tolerances of the adapter 8 in an exactly definable position relative to the Hall sensor 71. By additionally inserted spacers the play of the air gap between the receiver 84 for the Hall sensor 71 and the holding device for the field magnet 72 can be limited and a set operating threshold can be ensured. The link 85 which is movably coupled to the hinge joint 84 by the connection to the rocker 45 goes along with its up and down motion by positive action when the belt link is locked or unlocked and moves relative to the lengthwise arms 81 which are anchored on the vertical members 29. In this movement of the link 85 the field magnet 72 is moved in relative terms past the Hall measurement field(s) of the Hall sensor 71 which is mounted on the stationary lengthwise arm. The change in the magnetic field which occurs here is detected, relayed via the signal lines to the evaluation means and the signal "passenger belted" or "passenger not belted" for example is generated from it.

The Hall sensor can be a Hall sensor with only one Hall measurement field or a differential Hall sensor. An additional field magnet can also be mounted in the immediate vicinity of the Hall sensor in order to bias the Hall sensor.

Figure 20:
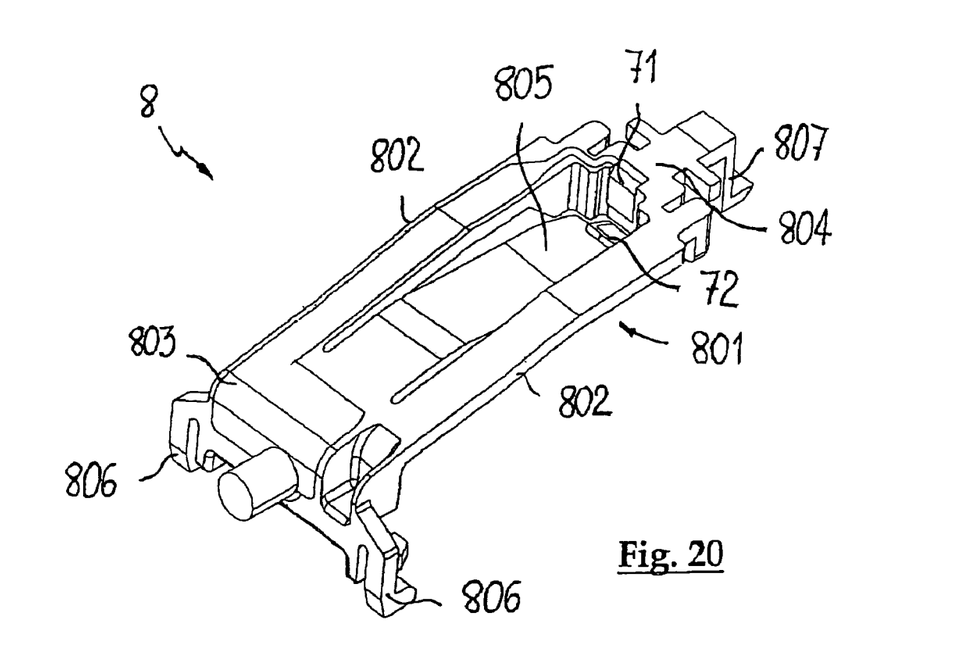
FIGS. 20 and 21 show two views of one alternative version of the Hall sensor adapter.
Figure 21:
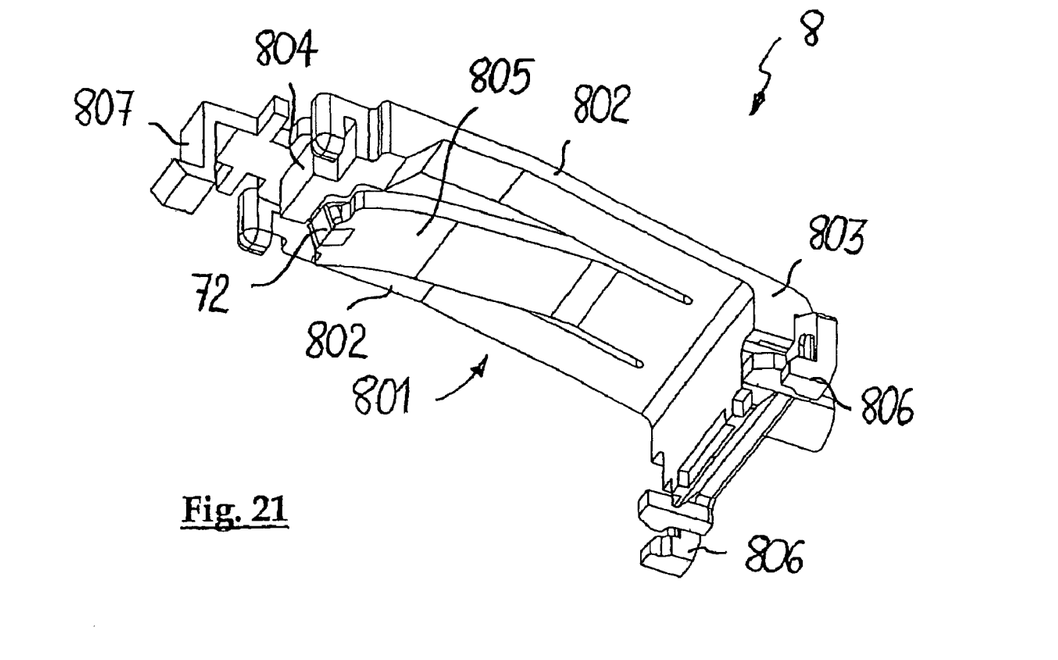

FIGS. 20 and 21 show two views of another embodiment of a Hall sensor arrangement made as a Hall sensor adapter. The Hall sensor adapter in turn overall bears reference number 8 and comprises a frame-like first adapter part 801 and a second adapter part which can be moved relative to the frame-like first adapter part 801, the second adapter part in the form of an arm 805 coupled to the frame part 803. The movable arm 805 is surrounded by the frame-like first adapter part 801. Two side parts 802 which run in the lengthwise direction are on the one hand connected by the frame part 803, from which the movable arm 805 projects. On the opposing side, in the vicinity of the free end of the movable arm 805, the side parts 802 are connected by a transverse part 804. As is apparent from FIGS. 20 and 21, the movable arm 805 has elastic pretensioning relative to the frame-like first adapter part 801. The elastic pretensioning of the movable arm 805 is dictated by the construction and material and can be supported by a spring element which is integrated into the frame part 803 and the movable arm 805.

The frame-like first adapter part 801 is equipped with holding devices 806, 807, by which the first adapter part 801 can be mounted on the stationary component. The holding devices 806, 807 are specifically matched to the component to which the first adapter part 801 is to be connected. The Hall sensor adapter 8 shown in FIGS. 20 and 21 is for example made for installation in a belt lock. Accordingly the holding devices 806, 807 are made such that the first adapter part 810 can be mounted for example on a belt lock frame. The elastically pretensioned movable arm 805 with the Hall sensor adapter 8 mounted adjoins the component which changes its position. When the Hall sensor adapter 8 is used in a belt lock, the movable arm 805 with low pretensioning adjoins the component of the locking mechanism which changes its position into two end positions in the closing or opening process. For example, it is a rocker (FIG. 14) which carries a locking element (FIG. 14) or a spring which acts on a rocker or another locking element. The Hall sensor 71 which can also be a differential Hall sensor is located on the frame-like first adapter component 801. In this embodiment the Hall sensor 71 is mounted on the transverse part 804. But it can also be mounted in the vicinity of the free end of the movable arm 805 on one of the side parts. The field magnet 72 is located on the free front end of the elastically pretensioned, movable arm 805.

The Hall sensor adapter is a plastic part which is produced for example in a plastic injection or plastic casting or plastic injection molding process. This allows production with very small production tolerances. In the Hall sensor adapter as shown in FIGS. 18 and 19, the hinge joint can be made for example as an integral film hinge. In the Hall sensor adapter as shown in FIGS. 20 and 21, the spring element which supports the elastic pretensioning of the actuator which is made as a movable arm can be embedded in the plastic material. The field magnet and the Hall sensor can also be embedded directly into the plastic material. By lateral stiffening of the film hinge, lateral hinge deflections can be further limited. On the holding devices and holding elements of the adapter which are used for anchoring, there can be other stiffening to ensure reliable anchoring. The adapter can be anchored detachably or captively on the frame and on the rocker (FIG. 17). The Hall sensor and the field magnet can be located fixed or removably on the adapter. It goes without saying that the arrangement of the Hall sensor and of the field magnet can also be interchanged. In this case the Hall sensor is moved relative to the stationary field magnet when the rocker moves. But due to the stresses which however may occur on the signal lines connected to the Hall sensor, the reverse arrangement is preferred.

The Hall sensor adapter has an especially space-saving construction. For its operation it uses only the movable components which are present anyway in the belt lock, especially the motion of a rocker which bears the locking body or of the locking body or a spring which acts on the locking body relative to the frame. In this connection is can be very easily installed as a monolithic component, especially can be suspended and clipped in. Relatively large signal levels and thus large signal-to-noise ratios can be achieved by the relative movement of the field magnet to the Hall sensor. The Hall sensor arrangement in the installed state is located on the side of the belt lock facing away from the passenger. This largely prevents any adverse effect by external magnetic fields, for example by a magnet or the like which is located in the pocket of the pants or coat of the passenger. The Hall sensor arrangement located in the adapter is located in the interior of the belt lock. In this way the metallic components surrounding the Hall sensor arrangement apply a shielding action. This arrangement makes it possible to build the Hall sensor arrangement with a conventional Hall sensor with one measurement field or with a differential Hall sensor with two measurement fields. The Hall sensor adapter can also be biased by an additional field magnet. The Hall sensor adapter is also characterized in that modifications of the belt lock is not necessary for its installation. In the installed state the Hall sensor adapter also largely eliminates rattling noise by damping larger relative movements of movable components of the locking mechanism relative to the frame of the belt lock.

What is claimed is:

1. Hall sensor arrangement for detection of the change in the position of two components which can move relative to one another into two end positions with a Hall sensor with at least one Hall measurement field and a field magnet, characterized in that there is an actuator for transmitting to the Hall sensor the change in the position of the two components which can move relative to one another and the Hall sensor and the field magnet are combined into a preassembled structural unit such that when the position of the field magnet changes relative to the Hall sensor from one end position into the other end position the polarity of the magnetic field acting on the Hall measurement field changes, wherein the Hall sensor and the field magnet are located on an adapter which is made as a monolithic component and has two adapter parts which are made to be movable relative to one another, one adapter part bearing the Hall sensor and the second adapter part bearing the field magnet, wherein one adapter part has two lengthwise arms with free ends provided with retaining hooks which are made for mounting on one stationary component and on their opposite ends are connected by a cross arm, and the second adapter part forms the actuator which is made as a link which is movably coupled to the cross arm via a hinge joint and which has fasteners for locking to the second component which can move relative to the first component.

2. Hall sensor arrangement as claimed in claim 1, wherein the Hall sensor is a differential Hall sensor with at least two Hall measurement fields located linearly next to one another or in succession.

3. Hall sensor arrangement as claimed in claim 2, wherein the field magnet is arranged such that its direction of motion, when the position of the monitored component changes, runs essentially parallel to the linear arrangement of the Hall measurement fields on the differential Hall sensor.

4. Hall sensor arrangement as claimed in claim 3, wherein the field magnet has magnetization which runs essentially perpendicular to the linear arrangement of the Hall measurement fields on the differential Hall sensor.

5. Hall sensor arrangement as claimed in claim 3, wherein the field magnet has magnetization which runs essentially parallel to the linear arrangement of the Hall measurement fields on the differential Hall sensor.

6. Hall sensor arrangement as claimed in claim 1, wherein the hinge joint is a film hinge.

7. Hall sensor arrangement as claimed in claim 1, wherein the fasteners provided on the link encompass snap hooks which can be routed through a hole in the second component and can be locked to it.

8. Hall sensor arrangement as claimed in claim 1, wherein one of the arms has a receiver for the Hall sensor, while on the link, in the vicinity of the receiver, there is a holding device for the field magnet.

9. Hall sensor arrangement as claimed in claim 1, wherein there is a bias magnet in the immediate vicinity of the Hall sensor.

10. Hall sensor arrangement as claimed in claim 9, wherein the adapter is a monolithic plastic part which is produced in an injection, casting or injection molding process.

11. Use of a Hall sensor arrangement as claimed in claim 1 in the belt lock of a motor vehicle for monitoring the locking mechanism of the belt lock.

12. Hall sensor arrangement for detection of the change in the position of two components which can move relative to one another into two end positions, with a Hall sensor with at least one Hall measurement field and a field magnet, characterized in that there is an actuator for transmitting to the Hall sensor the change in the position of the two components which can move relative to one another and the Hall sensor and the field magnet are combined into a preassembled structural unit such that when the position of the field magnet changes relative to the Hall sensor from one end position into the other end position the polarity of the magnetic field acting on the Hall measurement field changes, wherein the Hall sensor and the field magnet are located on an adapter which is made as a monolithic component and has two adapter parts which are made to be movable relative to one another, one adapter part bearing the Hall sensor and the second adapter part bearing the field magnet, wherein the adapter is made frame-like and is provided with holding devices for installation on a first stationary component, and the actuator is formed by a movable arm which is surrounded by the frame connected to a part of the frame, and elastically pretensioned relative to the frame, and wherein the elastic pretensioning is supported by a spring element which is integrated into the frame part and the movable arm.

13. Hall sensor arrangement as claimed in claim 12, wherein the Hall sensor is located on the frame and the field magnet is located on the movable arm.

14. Hall sensor arrangement as claimed in claim 12, wherein the Hall sensor is a differential Hall sensor with two Hall measurement fields which are located linearly next to one another or in succession.

15. Hall sensor arrangement as claimed in claim 14, wherein the field magnet is arranged such that its direction of motion, when the position of the monitored component changes, runs essentially parallel to the linear arrangement of the Hall measurement fields on the differential Hall sensor.

16. Hall sensor arrangement as claimed in claim 15, wherein the field magnet has magnetization which runs essentially perpendicular to the linear arrangement of the Hall measurement fields on the differential Hall sensor.

17. Hall sensor arrangement as claimed in claim 15, wherein the field magnet has magnetization which runs essentially parallel to the linear arrangement of the Hall measurement fields on the differential Hall sensor.

18. Hall sensor arrangement as claimed in claim 12, wherein there is a bias magnet in the immediate vicinity of the Hall sensor.

19. Hall sensor arrangement as claimed in claim 18, wherein the adapter is a monolithic plastic part which is produced in an injection, casting or injection molding process.

20. Use of a Hall sensor arrangement as claimed in claim 12 in the belt lock of a motor vehicle for monitoring the locking mechanism of the belt lock.

21. Belt lock with a lock mechanism and a hall sensor arrangement for detection of the change in the position of two components which can move relative to one another into two end positions, with a Hall sensor with at least one Hall measurement field and a field magnet, characterized in that there is an actuator for transmitting to the Hall sensor the change in the position of the two components which can move relative to one another and the Hall sensor and the field magnet are combined into a preassembled structural unit such that when the position of the field magnet changes relative to the Hall sensor from one end position into the other end position the polarity of the magnetic field acting on the Hall measurement field changes, wherein the Hall sensor arrangement is arranged such that the actuator duplicates the change in the position of a component which can be moved from one end position into a second end position when locking, and wherein the Hall sensor and the field magnet are located on an adapter which is made as a monolithic component and has two adapter parts which are made to be movable relative to one another, one adapter part bearing the Hall sensor and the second adapter part bearing the field magnet, and wherein the first part of the adapter which bears the Hall sensor is connected to a frame of the belt lock, while the second part of the adapter which bears the field magnet is connected positively and nonpositively to a rocker which bears a locking body and which assumes one of two alternative end positions in the locking or opening process.

22. Belt lock as claimed in claim 21, wherein the adapter is made frame-like and is provided with holding devices for installation on a first stationary component, and the actuator is formed by a movable arm which is surrounded by the frame, connected to a part of the frame, and elastically pretensioned relative to the frame, and wherein the movable arm adjoins a spring which acts on the locking body or a rocker which bears the locking body and which assumes one of two alternative end positions in the locking or opening process.

23. Belt lock as claimed in claim 21, wherein the Hall sensor arrangement is located on a side of the locking mechanism facing away from a belted passenger.

24. Hall sensor arrangement as claimed in claim 21, wherein the Hall sensor is a differential Hall sensor with at least two Hall measurement fields located linearly next to one another or in succession.

25. Hall sensor arrangement as claimed in claim 24, wherein the field magnet is arranged such that its direction of motion, when the position of the monitored component changes, runs essentially parallel to the linear arrangement of the Hall measurement fields on the differential Hall sensor.

26. Hall sensor arrangement as claimed in claim 25, wherein the field magnet has magnetization which runs essentially perpendicular to the linear arrangement of the Hall measurement fields on the differential Hall sensor.

27. Hall sensor arrangement as claimed in claim 25, wherein the field magnet has magnetization which runs essentially parallel to the linear arrangement of the Hall measurement fields on the differential Hall sensor.

28. Hall sensor arrangement as claimed in claim 21, wherein there is a bias magnet in the immediate vicinity of the Hall sensor.

29. Hall sensor arrangement as claimed in claim 28, wherein the adapter is a monolithic plastic part which is produced in an injection, casting or injection molding process.

30. Use of a Hall sensor arrangement as claimed in claim 21 in the belt lock of a motor vehicle for monitoring the locking mechanism of the belt lock.

* * * * *